United States Patent [19]
Iwasaki

[11] Patent Number: 5,347,228
[45] Date of Patent: Sep. 13, 1994

[54] BPSK DEMODULATOR USING COMPOUND PHASE-LOCKED LOOP

[75] Inventor: Jun Iwasaki, Tokyo, Japan
[73] Assignee: Sony, Tokyo, Japan
[21] Appl. No.: 94,560
[22] Filed: Jul. 20, 1993
[30] Foreign Application Priority Data
Jul. 31, 1992 [JP] Japan .................. 4-225282
[51] Int. Cl.[5] .......................... H04L 27/22
[52] U.S. Cl. ................... 329/308; 329/309; 375/81; 375/87
[58] Field of Search ............ 329/304, 305, 307, 308, 329/309, 310; 375/81, 87

[56] References Cited

U.S. PATENT DOCUMENTS 5,233,631  8/1993  Labat et al. .................. 375/81

Primary Examiner—Siegfried H. Grimm
Attorney, Agent, or Firm—Limbach & Limbach

[57] ABSTRACT

A BPSK demodulator having a compound phase locked loop, such as a Costas loop, is disclosed. An in-phase component, signal SI from a Costas loop demodulating section 10 is converted by a symmetrical binary-valued signal forming converting circuit 21 into binary-valued signals, while a quadrature signal component SQ from the demodulating section 10 is also converted by a non-symmetrical binary-valued signal forming converting circuit 22 into binary-valued signals. The outputs of the circuits 21, 22 are supplied to a flip-flop 23 as its data input and its clock input, respectively. An output of flip-flop 23 is integrated by an integrating circuit 25. A CPU 28 decides whether or not an integrated value from integrating circuit 25 exceeds a predetermined threshold value TH to decide whether or not the Costas loop demodulating section 10 is in the locked state. In this manner, the locked state can be detected by a simplified constitution, while a pseudo-locked state may also be detected.

6 Claims, 4 Drawing Sheets

BPSK DEMODULATOR USING COMPOUND PHASE-LOCKED LOOP

BACKGROUND OF THE INVENTION

This invention relates to a bi-phase phase shift keying (BPSK) demodulator. More particularly, it relates to a BPSK demodulator employing a compound phase locked loop circuit, such as a Costas loop.

A variety of communication systems has hitherto been known for transmitting data signals. Recently, a phase modulation system, or a phase shift keying (PSK) system, transmitting data by taking advantage of phase changes, has come into widespread application.

Above all, in the communication with a moving object, a bi-phase phase shift keying (BPSK) system transmitting data using two phase changes is frequently employed. A compound phase locked loop circuit (compound PLL circuit), such as a Costas loop, is frequently employed in its demodulating section. When the carrier frequency and phase of the PLL input signals coincide with the oscillation frequency and phase of a voltage-controlled oscillator (VCO), respectively, the compound phase-locked loop circuit enters the so-called locked state to perform synchronous follow-up data demodulation.

The conventional practice for detecting the locking state has been to square an in-phase I-channel component and an quadrature Q-channel component for detecting the locked state, resulting in an increased circuit scale of the locking detector and complicated calculation.

On the other hand, if, with the use of the PLL type demodulator, the frequency of the carrier wave of input signals is deviated relative to the oscillation frequency of the VCO towards a higher frequency or a lower frequency by an amount equal to an integer times of one-half of the frequency of the data transmission rate, the PLL circuit enters a pseudo-locked state in which the PLL circuit is actually not locked to correct signals and yet looks as if it were locked to correct signals. With such pseudo-locked state, data cannot be read as normally.

There are a number of locking detectors in the prior art which are unable to distinguish the pseudo-locked state from the normal locked state, such that certain prior-art systems need to have a pseudo-locking detector in addition to the locking detector.

SUMMARY OF THE INVENTION

In view of the above-described status of the art, it is an object of the present invention to provide a BPSK demodulator whereby the locking and pseudo-locking may be distinguished from each other by a simplified circuit construction.

According to the present invention, there is provided a BPSK demodulator having a compound phase locked loop, comprising first binary-valued signal forming converting means for converting demodulated synchronizing component signals into binary-valued signals, second binary-valued signal forming converting means for similarly converting demodulated orthogonal component signals into binary-valued signals, a flip-flop having an output of the first binary-valued signals forming converting means as a data input and having an output of the second binary-value forming converting means as a clock input, integrating means for integrating an output of the flip-flop, and decision means for deciding that, if the absolute value of an output of the integrating means is larger than a predetermined threshold value, the compound phase locked loop is in an unlocked state.

The second binary-valued signal forming converting means preferably is designed as non-symmetrical binary-valued signal forming converting means having a threshold value for generation of binary-valued signals which is deviated from the center of the signal amplitude. The integrating means preferably is comprised of third binary-value signal forming converting means for converting the flip-flop output depending on the sign of the output and a digital integrator for integrating an output of the third binary-value signal forming converting means. Preferably, the compound phase locking loop when unlocked is once re-set to an open-loop state.

With the above-described BPSK demodulator, the locking state may be detected by converting the in-phase component and the quadrature signal component into binary-valued signals in an arbitrary manner, inputting the resulting binary-valued signals to a flip-flop, converting the output of the flip-flop into binary-valued signals and integrating the resulting binary-valued signals. In this manner, the locked state and the pseudo-locked state may be detected by a circuit construction which is significantly simpler than the conventional locking detector.

DESCRIPTION OF PREFERRED EMBODIMENT

Figure 1:
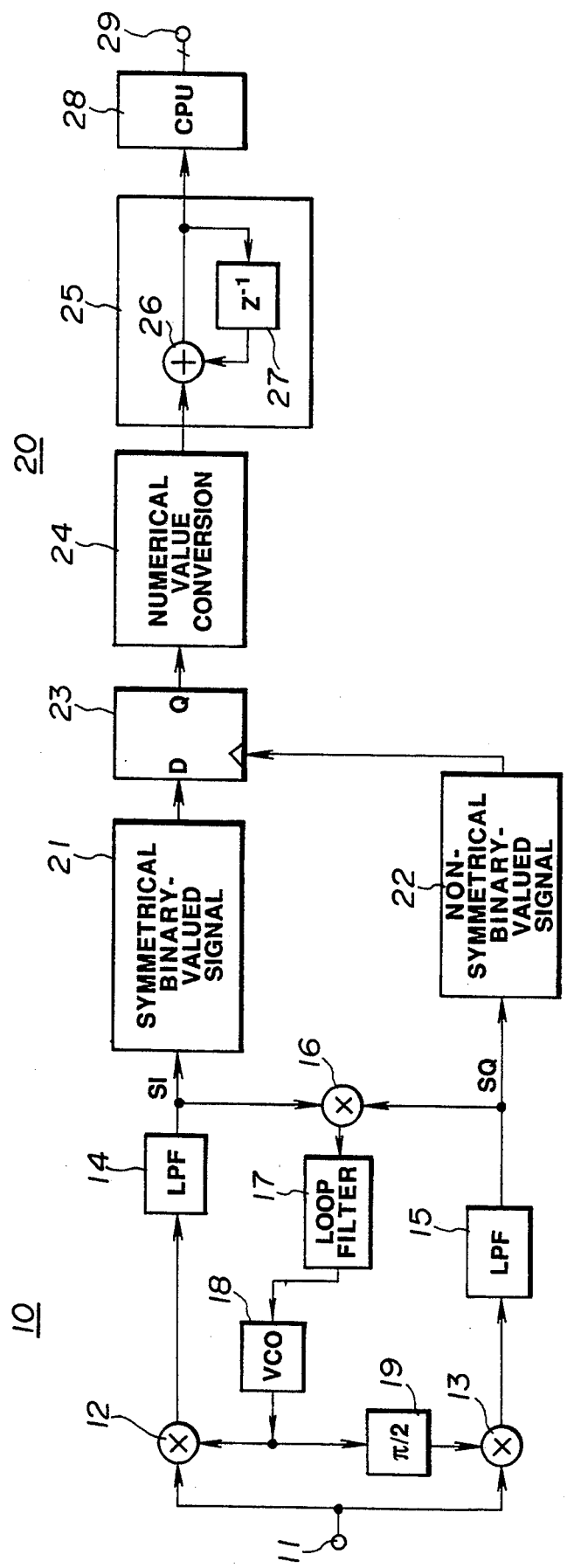
FIG. 1 is a schematic block diagram for illustrating essential parts of an embodiment of the BPSK demodulator according to the present invention.

FIG. 1 shows, in a schematic block diagram, an arrangement of an embodiment of the BPSK demodulator according to the present invention.

Referring to FIG. 1, signals modulated in accordance with the BPSK system are supplied to an input terminal 11 of a so-called Costas loop demodulator 10 so as to be transmitted to a multiplier 12 for an I-channel and to a multiplier 13 for a Q-channel. Output signals from multipliers 12, 13 are supplied to low-pass filters (LPFs) 14, 15 respectively. Output signals of the LPFs 14, 15 are supplied to a multiplier 16 for multiplication. An output signal from multiplier 16 is transmitted via a loop filter 17 to a voltage controlled oscillator (VCO) 18, output signals of which are supplied directly to multiplier 12 and via a $\pi/2$ phase shifter 19 to multiplier 13.

With the above-described Costas loop demodulator 10, digital input signals from input terminal 11 are multiplied by multiplier 12 with the output signals from VCO 18. The output signals from VCO 18 are multiplied by multiplier 13 with the output signals of VCO 18 delayed by $\pi/2$ by a $\pi/2$ phase shifter 19. The output signals from these multipliers 12, 13 are freed by LPFs 14, 15 of frequency components higher than predetermined frequencies. The I-channel multiplication output from LPF 14 and the Q-channel multiplication output from LPF 15 are supplied to multiplier 16 for multiplication. The resulting multiplication output is supplied via loop filter 17 to VCO 18 for controlling the oscillation frequency and the phase of VCO 18 into coincidence with the carrier frequency and the phase of the carrier wave of the input signals, respectively.

Meanwhile, the output signals from LPF 14 are demodulation signals of the Costas loop demodulator 10, of playback data. These data are taken out as signal SI so as to be transmitted to a symmetric binary-valued forming converting circuit 21 of a locked state detector 20 as later described. On the other hand, the output signals from LPF 15 are supplied as signal SQ to a non-symmetric binary-valued circuit 22 of the locked state detector 20. It is assumed that digital signals are contemplated in the present description and the signals SI and SQ are 16-valued soft decision signals of from +7 to −8.

Figure 2:
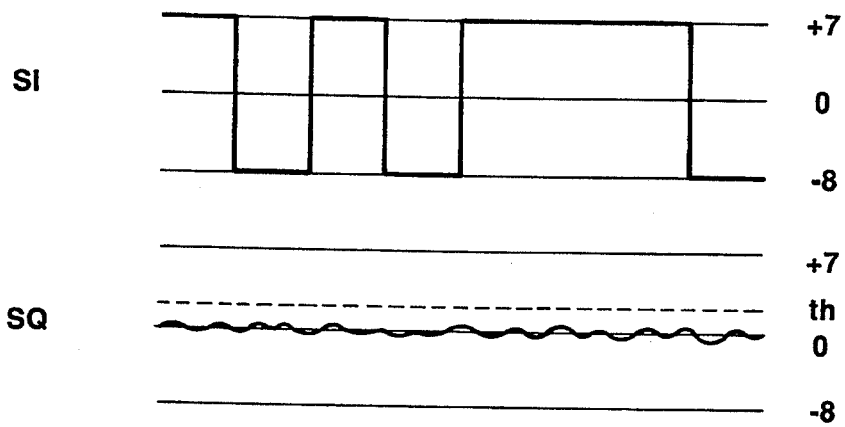
FIG. 2 is a waveform diagram for illustrating the operation of the embodiment shown in FIG. 1.
Figure 3:
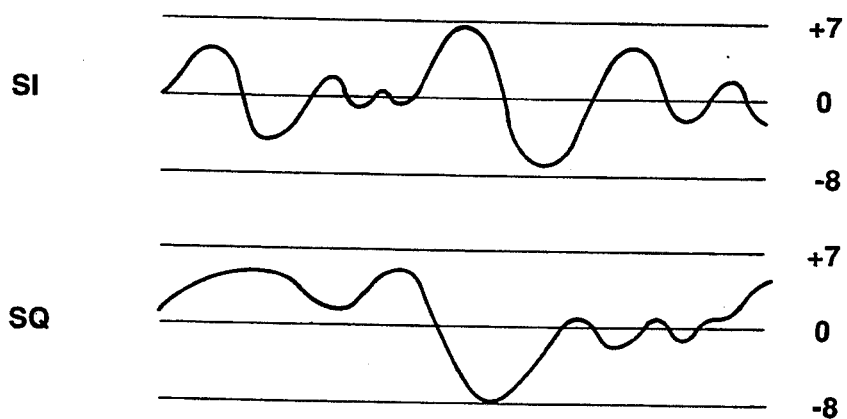
FIG. 3 is another waveform diagram for illustrating the operation of the embodiment shown in FIG. 1.
Figure 4:
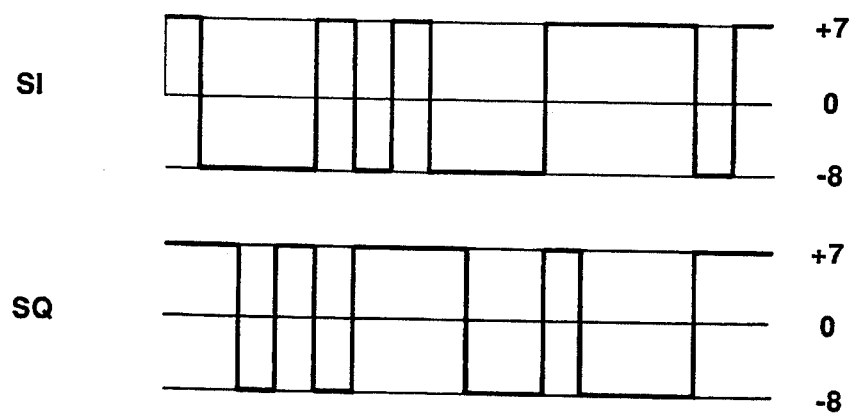
FIG. 4 is a further waveform diagram for illustrating the operation of the embodiment shown in FIG. 1.

FIGS. 2 to 4 illustrate the SI and SQ signals in the following states.

In the first place, FIG. 2 shows a locked state. In the locking state, the signal SI has already become the demodulated data, becoming digital signals having the values on the order of +7 and −8 corresponding to binary data of +1 and −1 respectively. Although the values differ depending on signal intensities, it is now assumed for the sake of explanation that the values are as shown in FIG. 2. The signal SQ takes on a value of ≦1 or 0, that is proximate to zero.

FIG. 3 shows the unlocked state in which the signals SI and SQ are both indefinite, that is in which the signals may take on any value in a random manner.

FIG. 4 shows the above-mentioned pseudo-locked state. Strictly speaking, the conditions differ depending on the frequency state under which pseudo-locking has been incurred. For example, the signals SI and SQ are changed as if the data transmission rate were doubled, as shown in FIG. 4, if the carrier of the input signals has its frequency shifted by one-half the frequency of the data transmission rate in the direction of the higher or lower frequency relative to the oscillation frequency of the VCO. The signal SI is naturally meaningless data, that is data not modulated correctly.

Returning to FIG. 1, the locking detector 20 comprises a symmetrical binary-value signal forming converting circuit 21, a non-symmetrical binary-value signal forming converting circuit 22, a flip-flop circuit 23, a numerical value forming translating circuit 24, an integrator 25 and a CPU 28. The integrator 25 is made up of an additive node 26 and a delay element 27. The signal SI from the Costas loop demodulator 10 is entered to the symmetrical binary-value signal forming converting circuit 21. The binary valued signal forming converting circuit 21 outputs a signal which is an "H" signal (high-level signal, such as +5 V) and a signal which is an "L" signal (low-level signal, such as 0 V) when the input signal takes on a value exceeding 0 or a negative value less than zero, respectively. The binary-valued output signal is supplied to a data input terminal D of flip-flop 23. The signal SQ from the Costa loop demodulator 10 is entered to the non-symmetrical binary-value signal forming converting circuit 22. This non-symmetrical binary-value signal forming converting circuit 22 effects a non-symmetrical binary-signal forming converting operation, in such a manner that, if the input signal is higher than an arbitrary threshold th outside of the center of the amplitude (approximately equal to zero) of the input signal, the circuit 22 outputs an "H" signal (high-level signal, such as +5 V) and, if the input signal is a negative signal less than the threshold th, the circuit outputs an "L" signal (low-level signal, such as 0 V). The flip-flop 23 is an ordinary D-flip-flop which outputs data on the falling edge of a clock. An "H" or "L" output of the flip-flop 23 is translated by the numerical value forming translating circuit 24 into numerical values of +1 or −1 which are integrated by digital integrator 25. The CPU 28 decides whether or not the absolute value of the integrated value exceeds a predetermined threshold TH different from the threshold th. An output of tile CPU 28 is transmitted at an output terminal 29.

The binary-value signal forming converting Circuits 21, 22 and the numerical value forming translating circuit 24 may be constituted by ROMs to which input signals are entered as addresses and which outputs the aforementioned "H", "L", "+1" or "−1" signals when corresponding values are entered thereto as input signals.

Consequently, in the locking state of FIG. 2, the signals 37 H" or "L" are entered in a random manner to the data input terminal of flip-flop 23, while mostly the signals "L" are entered to its clock input terminal because the signal SQ hardly exceeds the threshold th. The "H" or "L" signal is steadily outputted as outputs of the flip-flop 23 because the rising of the clock signal hardly occurs. Thus the numerical value forming translating circuit 24 steadily outputs +1 or −1. If +1 is entered steadily to the integrator 25, its output becomes a positive value equal to the number of times of the integrating operations, whereas, if −1 is entered steadily to the integrator 25, its output becomes a negative value equal to the number of times of the integrating operations. An absolute value of the output of integrator 25 is taken and compared to the above-mentioned threshold value TH. If the absolute value of the integrator output exceeds the threshold TH, a decision is given that the phase lock loop is in the locking state.

In the unlocked state, shown in FIG. 3, signals "H" or "L" are entered randomly to data input terminal D and clock input terminal of flip-flop 23. Since rising clocks are produced in this manner, the signals "H" or "L" are randomly produced, so that signals +1 or −1 are randomly outputted from the numerical figure generating translating circuit 24. Since the signals +1 and −1 are entered randomly to integrator 25, calculation of +1−1=0 occurs frequently so that the output of the integrator 25 cannot exceed the predetermined threshold TH. The phase locked loop may be decided from this to be in an unlocked stated.

The pseudo-locked state shown in FIG. 4 becomes similar to the above-mentioned unlocked state as to the input and output of the flip-flop 23 and the operations of the numerical value forming translating circuit 24 and the integrator 25, and may be decided in this manner to be the unlocked state.

It should be noted that the threshold th for non-symmetrical conversion into binary-valued signals on the order of the maximum value of the signal SQ of FIG. 2, such as, for example, in a range of +2 to +3, suffices. In the correctly locked state, an absolute value of the output of the integrator 25 is increased substantially proportionately to the number of times of integrating operations and otherwise an output value proximate to zero is issued. Consequently, the threshold value TH is set depending on the number of times of the integrating operations to values capable of distinguishing these two states from each other. CPU 28 makes use of the corresponding information to decide if the locked state is the correctly locked state, and outputs the results to output terminal 29. The above operations assure detection of the correct locked state.

Figure 5:
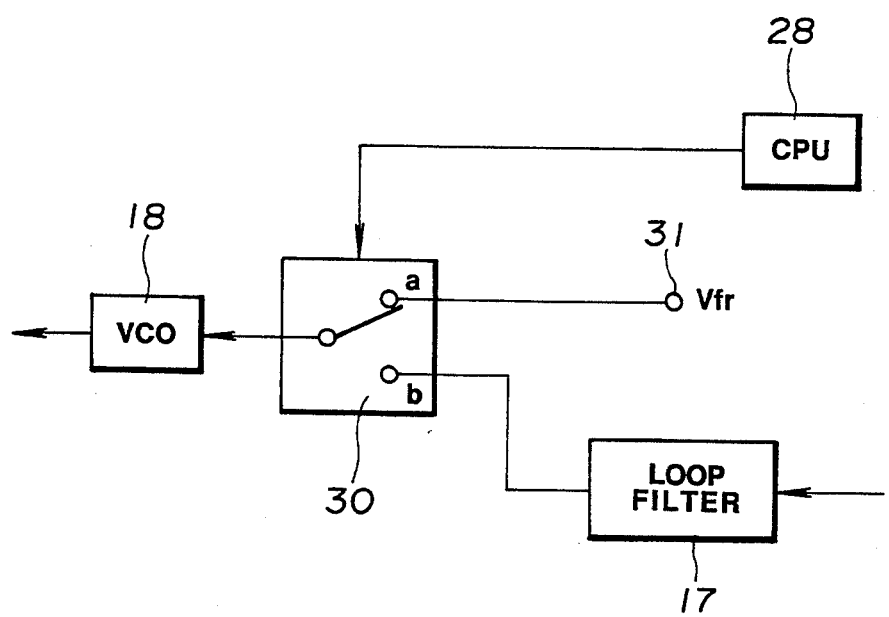
FIG. 5 is a schematic block diagram showing an arrangement of certain portions of the embodiment sown in FIG. 1.
Figure 6:
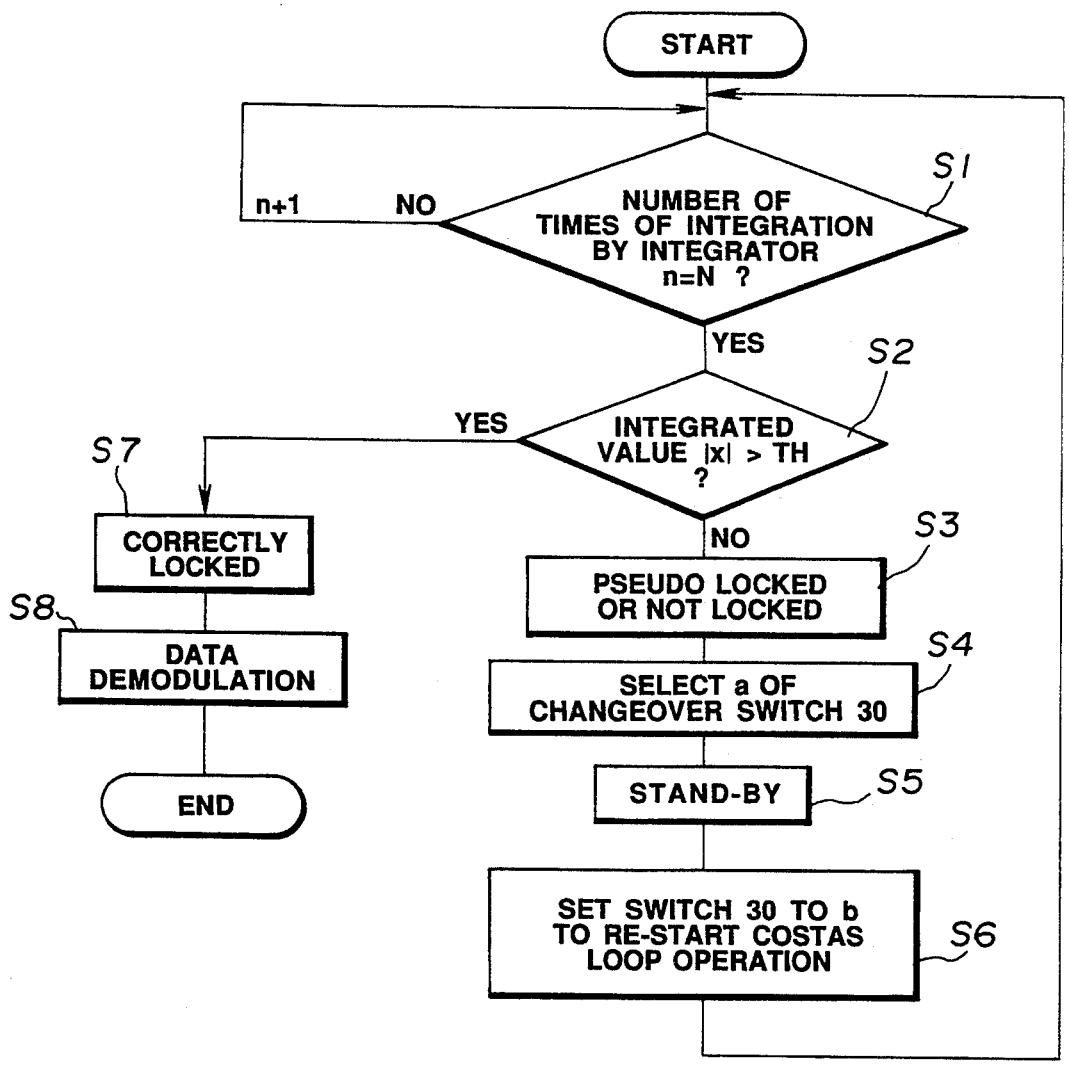
FIG. 6 is a flow chart for illustrating the operation of the embodiment shown in FIG. 1.

FIG. 5 shows an arrangement for performing an operation for the case in which CPU 28 decides that the prevailing locking state is not the correct locking state. FIG. 6 shows a flow chart for such operation.

Referring first to FIG. 5, a changeover switch 30 is inserted in a circuit path from loop filter 17 to VCO 18 within the Costas loop demodulator 10 of FIG. 1. A predetermined control voltage Vfr is supplied to a fixed terminal a of changeover switch 30 from input terminal 31, and an output signal from loop filter 17 is supplied to its fixed terminal b. The changeover switch 30 is changed over depending on a decision result output signal from CPU 28. The control voltage Vfr is pre-set to such a voltage as to cause VCO 18 to output a self-running frequency.

At step S1 of FIG. 6, CPU 28 decides whether or not the number of times of integrating operations n by integrator 25 has reached a predetermined number of integrating operations N. If the result of decision at step S1 is YES, control proceeds to next step S2 to decide if an absolute value $|x|$ of an output of integrator 25 exceeds the threshold value TH. If the result of decision at step S2 is NO, that is if the absolute value $|x|$ of an output of integrator 25 is not in excess of the threshold TH, control proceeds to step S3 to decide that the locking state is not the correct locking state. Control then proceeds to step S4 to select the fixed terminal a of changeover switch 30 to supply the free-running control voltage Vth to VCO 18 to set the Costas loop in its entirety to an open-loop state. Control then proceeds to step S5 for stand-by for a predetermined time. Control then proceeds to step S6 to return the movable contact of changeover switch 30 to its fixed terminal b to re-initiate the Costas loop operation. If the phase lock loop has entered the pseudo-locking state, it may be restored to its correct locking state by the above operation. That is, since the probability of the phase lock loop entering the pseudo-locking state is lower than that of the loop entering the correct locking state, it becomes possible to restore the correct locking state by the repetition of the above-described operation. If simply too much time has been involved in capturing, it occurs frequently that locking may be achieved more easily by once resetting the phase locked loop by establishing the open loop state.

If the result of decision at step S2 is YES, that is if the integrated value exceeds the threshold value TH, control proceeds to step S7 where CPU 28 decides that the locked state is correct. Control then proceeds to step S8 to effect data demodulation.

By the above-described sequence of operations, detection of the locking and prevention of detection of the pseudo locking may be realized by a simplified circuit construction.

It is to be noted that the present invention is not limited to the above-described embodiment which is given only for the sake of illustration. For example, the numerical value forming translating circuit may be omitted, while the integrator 25 may be designed differently from the illustrated constitution.

What is claimed is:

1. A BPSK demodulator having a compound phase locked loop, comprising
   first binary-valued signal forming converting means for converting demodulated synchronizing component signals into binary-valued signals,
   second binary-valued signal forming converting means for converting demodulated quadrature component signals into binary-valued signals,
   a flip-flop having an output of said first binary-valued signal forming means as a data input and having an output of said second binary-valued signal forming converting means as a clock input,
   integrating means for integrating an output of said flip-flop, and
   decision means for deciding that, if the absolute value of an output of said integrating means is larger than a predetermined threshold, said compound phase locked loop is in an unlocked state.

2. The BPSK demodulator as claimed in claim 1 wherein said second binary-valued signal forming converting means is a non-symmetrical binary-valued signal forming converting means having a threshold value for generating binary-valued signal deviated from the center of the signal amplitude.

3. The BPSK demodulator as claimed in claim 1 wherein said integrating means comprises third binary-value signal forming converting means for converting the output of said flip-flop depending on the sign of said output and a digital integrator for integrating an output of said third binary-value signal forming converting means.

4. The BPSK demodulator as claimed in claim 1 wherein said compound phase locking loop is once set to an open-loop state when in the unlocked state.

5. The BPSK demodulator as claimed in claim 1 wherein said compound phase locked loop comprises
   a first multiplier for demodulating a synchronizing component,
   a second multiplier for demodulating an quadrature component,
   a third multiplier supplied with output signals of said first and second multipliers via respective low-pass filters, and
   a voltage-controlled oscillator supplied with an output signal of said third multiplier via a loop filter,
   an output signal of said voltage-controlled oscillator being directly supplied to said first multiplier and via a $\pi/2$ phase shifter to said second multiplier.

6. The BPSK demodulator as claimed in claim 5 wherein a control voltage corresponding to a predetermined free-running frequency is supplied to said voltage-control led oscillator when said compound phase locked loop is in said unlocked state.

* * * * *